(12) United States Patent
Yang et al.

(10) Patent No.: US 9,151,277 B2
(45) Date of Patent: Oct. 6, 2015

(54) METHOD AND SYSTEM FOR POWER GENERATION

(71) Applicant: WUHAN KAIDI ENGINEERING TECHNOLOGY RESEARCH INSTITUTE CO., LTD., Wuhan (CN)

(72) Inventors: Qingping Yang, Wuhan (CN); Yanfeng Zhang, Wuhan (CN); Hong Li, Wuhan (CN)

(73) Assignee: Wuhan Kaidi Engineering Technology Research Institute Co., Ltd., Wuhan (CN)

( * ) Notice: Subject to any disclaimer, the term of this patent is extended or adjusted under 35 U.S.C. 154(b) by 244 days.

(21) Appl. No.: 13/853,048

(22) Filed: Mar. 28, 2013

(65) Prior Publication Data

US 2013/0219888 A1    Aug. 29, 2013

Related U.S. Application Data

(63) Continuation-in-part of application No. PCT/CN2011/078241, filed on Aug. 11, 2011.

(30) Foreign Application Priority Data

Sep. 29, 2010   (CN) .......................... 2010 1 0298986

(51) Int. Cl.
| | |
|---|---|
| *F03G 6/00* | (2006.01) |
| *F01K 7/22* | (2006.01) |
| *F22B 1/00* | (2006.01) |
| *F22B 1/18* | (2006.01) |
| *F03G 6/06* | (2006.01) |

(52) U.S. Cl.
CPC ... *F03G 6/00* (2013.01); *F01K 7/22* (2013.01); *F03G 6/065* (2013.01); *F22B 1/006* (2013.01); *F22B 1/18* (2013.01); *Y02E 10/46* (2013.01)

(58) Field of Classification Search
CPC ............. F03G 6/00; F03G 6/065; F22B 1/18; F22B 1/006; F01K 7/22; Y02E 10/46
USPC ................... 60/641.8–641.15, 653, 660–667, 60/677–680
See application file for complete search history.

(56) References Cited

U.S. PATENT DOCUMENTS

| | | | |
|---|---|---|---|
| 8,161,724 B2 * | 4/2012 | Shortlidge et al. | 60/39.182 |
| 8,701,773 B2 * | 4/2014 | O'Donnell et al. | 166/303 |
| 2004/0182080 A1 * | 9/2004 | Hendrix et al. | 60/641.8 |
| 2005/0279095 A1 * | 12/2005 | Goldman | 60/641.8 |
| 2008/0127647 A1 * | 6/2008 | Leitner | 60/645 |
| 2010/0206248 A1 * | 8/2010 | Mok | 122/17.1 |

* cited by examiner

*Primary Examiner* — Hoang Nguyen
(74) *Attorney, Agent, or Firm* — Matthias Scholl P.C.; Matthias Scholl

(57) ABSTRACT

A method of power generation, including: igniting a biomass boiler; starting a solar concentrating collector; measuring water temperature t3 at water outlet main of the solar concentrating collector; opening a second control valve arranged between the water outlet main and the boiler drum when t3 is greater or equal to 95° C.; closing the second control valve and the third control valve to prevent water in the solar collector tube from running and to maintain the water in a heat preserving and inactive state if the water temperature t3 decreases and t3 is less than 95° C.; turning the turbonator unit into a thermal power generation mode; opening a first control valve arranged between the water outlet main and a water supply tank if the water temperature t3 continues decreasing and when t3 is between 5 and 9° C.; and turning the turbonator unit into a biomass boiler power generation mode.

10 Claims, 4 Drawing Sheets

METHOD AND SYSTEM FOR POWER GENERATION

CROSS-REFERENCE TO RELATED APPLICATIONS

This application is a continuation-in-part of International Patent Application No. PCT/CN2011/078241 with an international filing date of Aug. 11, 2011, designating the United States, now pending, and further claims priority benefits to Chinese Patent Application No. 201010298986.7 filed Sep. 29, 2010. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 14781 Memorial Drive, Suite 1319, Houston, Tex. 77079.

BACKGROUND OF THE INVENTION

1. Field of the Invention

The invention relates to a solar power generation method and system using a biomass boiler as an auxiliary heat source.

2. Description of the Related Art

Solar energy is characteristic in its wide distribution, unlimited reserves, clean collection and utilization, and zero emission of $CO_2$. However, a large scale exploit and utilization of the solar energy is much higher than the exploit of the conventional fossil energy. Furthermore, the capture of solar energy is affected by the change of the weather, thereby being unstable and discontinuous. Therefore, how to solve the above problems becomes a hot topic in the current energy and power research field.

As an organic matter produced by the photosynthesis of plants, biomass is characteristics in its wide distribution, large amount of reserves, much cleaner than fossil energy, and zero emission of $CO_2$. Thus, biomass is a very important renewable energy; the development and exploit of the biomass is also a hot topic in the current energy and power research field. Biomass boiler power plant using straw of crops, forest fuel wood, and wastes from wood process as a biomass fuel becomes maturely industrialized. However, the heat value of the biomass fuel at a unit volume is lower than that of the coal at the same unit volume. In order to maintain a continuous operation of the biomass boiler power plant, the biomass fuel storage field requires a large area, thereby resulting in large demands of land. Furthermore, the biomass fuel stored in the open air is prone to wet, which affects the combustion, and some kind of biomass fuel is possible to auto-ignition in wet environment. All these problems critically restrict the whole beneficial result of the biomass boiler power plant.

The solar radiation is largely affected by the weather and the cloud, and the capture of the solar radiation can be only conducted during a local time period of 8:00-17:00, the above tower type or trough type solar power generation system has adopted a special developed fast started turbine (also known as a solar turbine, which is capable of running in day time and stopping during the night, or running in sunny days and stopping in cloudy days) in order to adapt to the characteristic of the solar energy, frequently and fast start the system, and maintain a stable operation of the turbine. Compared with a conventional fossil energy adapted turbine, the solar turbine is characteristic in no demand of a long time to preheat a jigger, being provided with a large enough heat storage system, and a twice heat exchange between a heat storage medium (heat transfer oil or molten salt) and a working medium (water vapor). However, this technical scheme makes the system more complicated, and needs a higher cost. The twice heat exchange lowers the thermoelectric conversion efficiency. Furthermore, the solar turbine has a larger volume, higher cost, and lower heat efficiency due to its special material and special structure.

More particularly, the system uses the molten salt as the heat storage medium, which makes the operation of the system become more difficult. Because at a temperature lower than 260° C., the molten salt is transformed from a liquid state into a solid state; and the solid state molten salt affects the operation of the system no matter it exists in pipes or in the heat storage tank. Thus, the molten slat is required to maintain at a temperature above 260° C. for long term, which, however, is energy consuming and is very difficult to realize.

In nocturnal period during winter or long term snowy and cloudy days when the temperature falls to 0° C. below, the above solar turbine is not capable of continuous operation. Besides no beneficial results is produced; how to prevent the system from freezing is a difficult and energy consuming problem.

SUMMARY OF THE INVENTION

In view of the above-described problems, it is one objective of the invention to provide a solar power generation method using a biomass boiler as an auxiliary heat source and a system related thereto. The method and system employ a biomass boiler as the auxiliary heat source, and combine the biomass energy and the solar power, thereby effectively solving the instability of the solar energy.

To achieve the above objective, in accordance with one embodiment of the invention, there is provided a solar power generation method using a biomass boiler as an auxiliary heat source, the method combines a solar concentrating collector; a biomass boiler; and a turbonator unit. The solar concentrating collector and the biomass boiler employ water as a working medium for heat adsorption and heat storage. The biomass boiler works as a second heat source for providing the auxiliary heat source to the solar power generation. The method comprises the following steps:

1) igniting the biomass boiler comprising a boiler drum when a water level L1 of the boiler drum reaches a preset water level; and starting the turbonator unit according to an operating procedure of a biomass boiler power plant;
2) starting the solar concentrating collector; measuring a water temperature t3 at a water outlet main of the solar concentrating collector; opening a second control valve arranged between the water outlet main of the solar concentrating collector and the boiler drum when t3≥95° C., and opening a third control valve to supply water to a solar collector tube; introducing water into the boiler drum; adjusting the water supply to the solar collector tube to maintain t3≥95° C. according to the water temperature t3; and self-regulating by a control system of the turbonator unit, maintaining the water level of the boiler drum, a vapor pressure and a vapor temperature at a vapor outlet of the biomass boiler at rated values, and maintaining a steady operation of the turbonator unit;
3) closing the second control valve of the water outlet main and the third control valve to prevent water in the solar collector tube from running and to maintain the water in a heat preserving and inactive state if the water supply to the solar collector tube is adjusted to a lowest value while the water temperature t3 at the water outlet main of the solar concentrating collector detected by the turbonator unit decreases and t3<95° C.; turning the turbonator unit into a thermal power generation mode; self-regulating by the control system of the turbonator unit; increasing a fuel input into the biomass boiler to maintain the vapor pressure and the vapor temperature at the vapor outlet of the biomass boiler at rated values and to maintain the steady operation of the turbonator unit;

4) opening a first control valve arranged between the water outlet main of the solar concentrating collector and a water supply tank if the water temperature t3 at the water outlet main of the solar concentrating collector continues decreasing and when t3=5-9° C.; opening a bleed valve to drain a room temperature water from the solar collector tube into a desalting water tank; opening a drain valve to remove remaining water from pipes; introducing compressed air via an opening of an exhaust valve into all pipes until no water remains; maintaining the solar concentrating collector and pipes at an anhydrous antifreezing state; and turning the turbonator unit into a biomass boiler power generation mode; and 5) repeating step 1) if the water temperature in the solar collector tube increases and t3≥95° C. due to a recovery of solar radiation; supplying water to the biomass boiler; and decreasing the fuel input into the biomass boiler by self-regulating of the turbonator unit.

A solar power generation system using a biomass boiler as an auxiliary heat source applied in the above method, comprises: the solar concentrating collector; the biomass boiler; and the turbonator unit. The solar concentrating collector and the biomass boiler employ water as the working medium for heat adsorption and heat storage. The solar concentrating collector adopts medium pressure vacuum solar collector tubes in a combination of a series-parallel matrix. An outlet of the solar concentrating collector is connected to a bottom of the boiler drum via the second control valve. The vapor outlet of the boiler drum is connected to a cylinder of a turbine.

In a class of this embodiment, the solar concentrating collector adopts the medium pressure vacuum solar collector tubes in the combination of the series-parallel matrix. The outlet of the solar concentrating collector is connected to the bottom of the boiler drum via the second control valve. The vapor outlet of the boiler drum is connected to the cylinder of the turbine.

In a class of this embodiment, a steam superheater is in series connection between the vapor outlet of the boiler drum and a pipe connected to the cylinder of the turbine. The steam superheater communicates with an inlet of a high pressure cylinder of the turbine. The steam superheater is placed inside a flue of the biomass boiler.

In a class of this embodiment, an outlet of a high pressure cylinder is connected to a steam reheater via a pipe. The steam reheater is connected to an inlet of a low pressure cylinder of the turbine. The steam reheater is placed inside a flue of the biomass boiler.

In a class of this embodiment, a condenser communicates with an outlet of the cylinder of the turbine. A water outlet of the condenser communicates with a deaerator. The water outlet of the condenser communicates with the solar collector tube and/or a water inlet of the biomass boiler via the deaerator and a first water pump.

In a class of this embodiment, an auxiliary heater is in series connection with a water inlet pipe of the biomass boiler, and the auxiliary heater is placed inside a flue of the biomass boiler.

In a class of this embodiment, the water supply tank of the solar concentrating collector and the biomass boiler is a desalting water tank comprising a heat insulation layer. The desalting water tank is connected to a deaerator via a second water pump, and further connected to the solar collector tube and a water inlet of the biomass boiler via the deaerator and a first water pump. The desalting water tank is connected to the outlet of the solar concentrating collector via the first control valve.

In a class of this embodiment, a temperature sensor T3 is arranged on a pipe between a water outlet of the solar concentrating collector and the second control valve and the first control valve. A control point displayed by the temperature sensor T3 is finally output in a control loop of the second control valve and the first control valve. An operating temperature of the temperature sensor T3 is preset within a temperature range of a safe operation of the biomass boiler.

In a class of this embodiment, the solar concentrating collector comprises: a parabolic chute mirror, and the vacuum solar collector tube; and the vacuum solar collector tube is disposed on a focal line of the parabolic chute mirror.

In a class of this embodiment, the solar concentrating collector comprises: a reflective Fresnel lens, and the vacuum solar collector tube; and the vacuum solar collector tube is disposed on a focal line of the reflective Fresnel lens.

In a class of this embodiment, the solar concentrating collector comprises: a transmission Fresnel lens, and the vacuum solar collector tube; and the vacuum solar collector tube is disposed on a focal line of the transmission Fresnel lens.

Advantages of the invention are summarized as follows:

The two heat source power generation system of the invention is provided with a plurality of different valves, and is capable to switch the system to a solar power generation mode, a biomass power generation mode, or a solar-biomass combined power generation mode according to the change of the solar radiation due to the switch of day and night and the change of the weather. Thus, the turbonator unit is capable of continuous operating day and night, and the problem of the freeze prevention of the solar concentrating collector during winter is solved.

As the highest temperature of the water heated by the solar concentrating collector is far lower than that of the water heated by a conventional boiler, the biomass boiler of the invention is provided with the auxiliary heater, the steam superheater, and the steam reheater. The water in the solar concentrating collector is introduced into the boiler drum and the auxiliary devices to be superheated or reheated, thereby achieving a temperature gradient operation of the solar heat energy, and improving a heat efficiency of the whole turbonator unit.

The power generation system of the invention is simplified by discarding a heat storage system (using a conduction oil or a molten salt as a heat storage medium) applied in a solar thermal power plant of prior arts, and is capable of alternatively or simultaneously making use of the solar heat source or the biomass heat source according to the change of the solar radiation due to the alternation of day and night and the change of the weather to maintain the continuous operation of the turbonator unit day and night, thereby effectively improving the availability of the solar energy power generation system, as well as solving the problem of the freeze prevention of the solar concentrating collector during winter.

The solar concentrating collector is placed on a roof of a biomass fuel storage field. Because the area of the biomass fuel storage field is large enough, this arrangement prevents the biomass fuel from the rain, and improves the land utilization of the solar thermal power plant using the biomass boiler as the second heat source.

DETAILED DESCRIPTION OF THE EMBODIMENTS

A solar power generation method using a biomass boiler as an auxiliary heat source and a system related thereto are specifically described hereinbelow combined with accompanying drawings.

Figure 1:
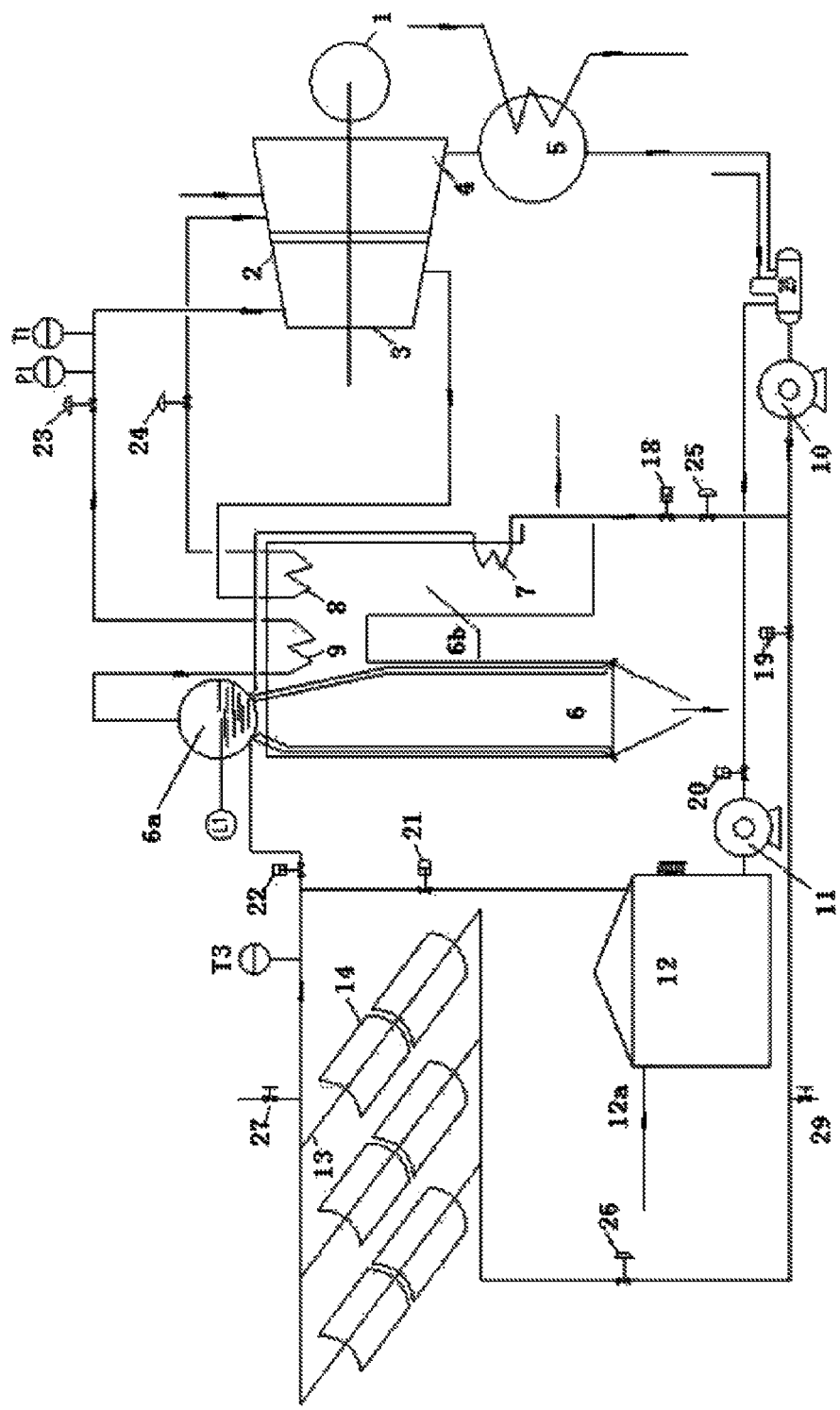
FIG. 1 is a structure diagram of a solar power generation system of the invention.

As shown in FIG. 1, 1 represents an electric generator; 2 represents a turbine; 3 represents a high pressure cylinder of the turbine 2; 4 represents a low pressure cylinder of the turbine 2; 5 represents a condenser; 6 represents a biomass boiler; 7 represents an auxiliary heater arranged inside a flue 6a of the biomass boiler 6; 8 represents a steam reheater arranged inside a flue 6a of the biomass boiler 6; 9 represents a steam superheater arranged inside a flue 6a of the biomass boiler 6; 10 represents a first water pump; 11 represents a second water pump of the biomass boiler 6; 12 represents a desalting water tank provided with a heat insulation layer for storing a soft water from a chemical water treatment device; 13 represents a solar collector tube; and 14 represents a parabolic chute mirror. n solar collector tubes 13 and m parabolic chute mirrors are assembled to form a solar collector field, in which, n and m are both positive integers. 19, 20, 21, 22 represent switch valves (by adopting a pneumatic valve, a electric valve, a hydraulic valve, or an electromagnetic valve; and pneumatic valves are shown in FIG. 1), these switch valves control an operation mode of the whole power generation system. 23, 24, 25, 26 represent regulating valves (pneumatically, electrically, or hydraulically; and pneumatically regulating valves are shown in FIG. 1); of them, 23 and 24 are capable of regulating vapor flow input into the turbine; 25 is capable of regulating a water flow; and 26 is capable of regulating water flow into a water main of the solar concentrating collector. 28 represents a deaerator; L1 represents a level gauge of the boiler drum; P1 represents a vapor pressure gauge at an outlet of the biomass boiler (a detected pressure value is represented by p1); T1 represents a vapor temperature sensor at the outlet of the biomass boiler (a detected temperature value is represented by t1); and T3 represents a water temperature sensor at a water outlet main of the solar concentrating collector (a detected temperature value is represented by t3).

A solar power generation system using a biomass boiler as an auxiliary heat source, comprises: a solar concentrating collector; a biomass boiler; and a turbonator unit. The solar concentrating collector and the biomass boiler employ water as a working medium for heat adsorption and heat storage. The solar concentrating collector adopts medium pressure vacuum solar collector tubes 13 in a combination of a series-parallel matrix. An outlet of the solar concentrating collector is connected to a bottom of a boiler drum 6a via a second control valve 22. A vapor outlet of the boiler drum 6a is connected to a cylinder of a turbine. The solar concentrating collector and the biomass boiler directly heat the same water to produce water vapor which drives a turbine to operate and to drive an electric generator 2.

A water inlet pipe of the solar concentrating collector is in series connection with a deaerator 28 and a first water pump 10.

A steam superheater 9 is in series connection between the vapor outlet of the boiler drum 6a and a pipe connected to the cylinder of the turbine. The steam superheater 9 communicates with an inlet of a high pressure cylinder 3 of the turbine. The steam superheater 9 is placed inside a flue 6b of the biomass boiler. A flue gas in the biomass boiler heats the water vapor and transforms the water vapor into a dry steam.

An outlet of the high pressure cylinder 3 is connected to a steam reheater 8 via a pipe. The steam reheater 8 is connected to an inlet of a low pressure cylinder of the turbine. The steam reheater 8 is placed inside a flue 6b of the biomass boiler. The flue gas in the biomass boiler heats the steam.

A condenser 5 communicates with an outlet of the cylinder of the turbine. A water outlet of the condenser 5 communicates with the deaerator 28. The water outlet of the condenser 5 communicates with the solar collector tube 13 and/or a water inlet of the biomass boiler via the deaerator 28 and the first water pump 10, thereby realizing a water circulation.

An auxiliary heater 7 is in series connection with a water inlet pipe of the biomass boiler 6, and the auxiliary heater 7 is placed inside a flue 6b of the biomass boiler. The gas flue in the biomass boiler preheats the water in the biomass boiler.

A water supply tank of the solar concentrating collector and the biomass boiler is a desalting water tank 12 comprising a heat insulation layer. The desalting water tank 12 is connected to the deaerator 28 via a second water pump 11, and further connected to the solar collector tube 13 and a water inlet of the biomass boiler via the deaerator 28 and a first water pump 10. The desalting water tank 12 is connected to the outlet of the solar concentrating collector via a first control valve 21.

A temperature sensor T3 is arranged on a pipe between a water outlet of the solar concentrating collector and the second control valve 22 and the first control valve 21. A control point displayed by the temperature sensor T3 is finally output in a control loop of the second control valve 22 and the first control valve 21. An operating temperature of the temperature sensor T3 is preset within a temperature range of a safe operation of the biomass boiler.

Figure 2:
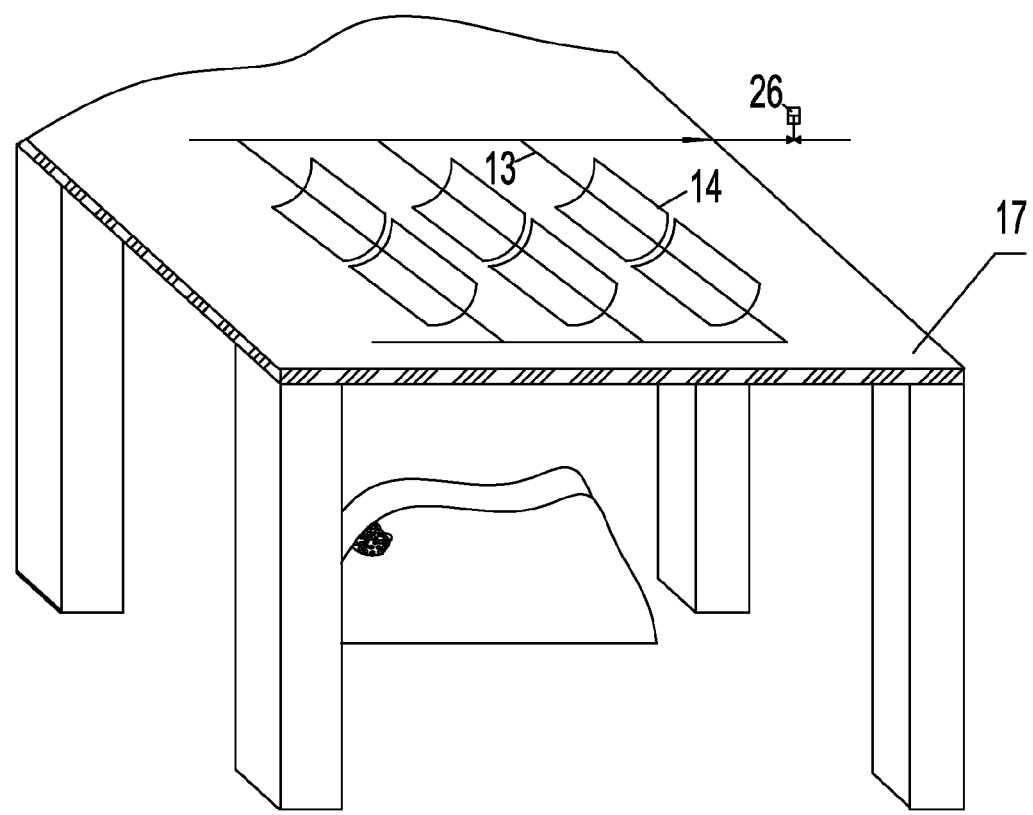
FIG. 2 is a structure diagram of a parabolic trough type solar concentrating collector disposed on a roof of a biomass fuel storage field.

FIG. 2 is a structure diagram of a parabolic trough type solar concentrating collector disposed on a roof of a biomass fuel storage field. The solar concentrating collector comprises: a parabolic chute mirror 14, and the vacuum solar collector tube 13; and the vacuum solar collector tube 13 is disposed on a focal line of the parabolic chute mirror. 17 represents the roof of the biomass fuel storage field.

Figure 3:
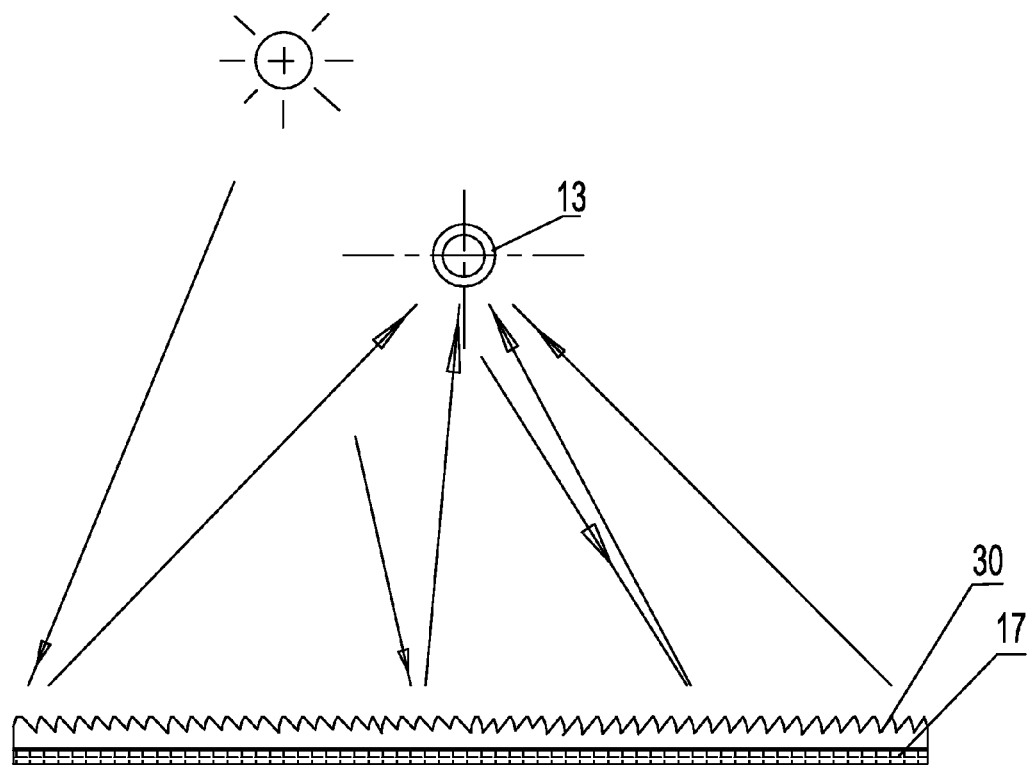
FIG. 3 is a structure diagram of a solar concentrating collector comprising a reflective Fresnel lens and a vacuum solar collector tube.

FIG. 3 is a structure diagram of a solar concentrating collector comprising: a reflective Fresnel lens, and a vacuum solar collector tube. The solar concentrating collector comprises: a reflective Fresnel lens 30, and the vacuum solar collector tube 13. The vacuum solar collector tube 13 is disposed on a focal line of the reflective Fresnel lens 30.

Figure 4:
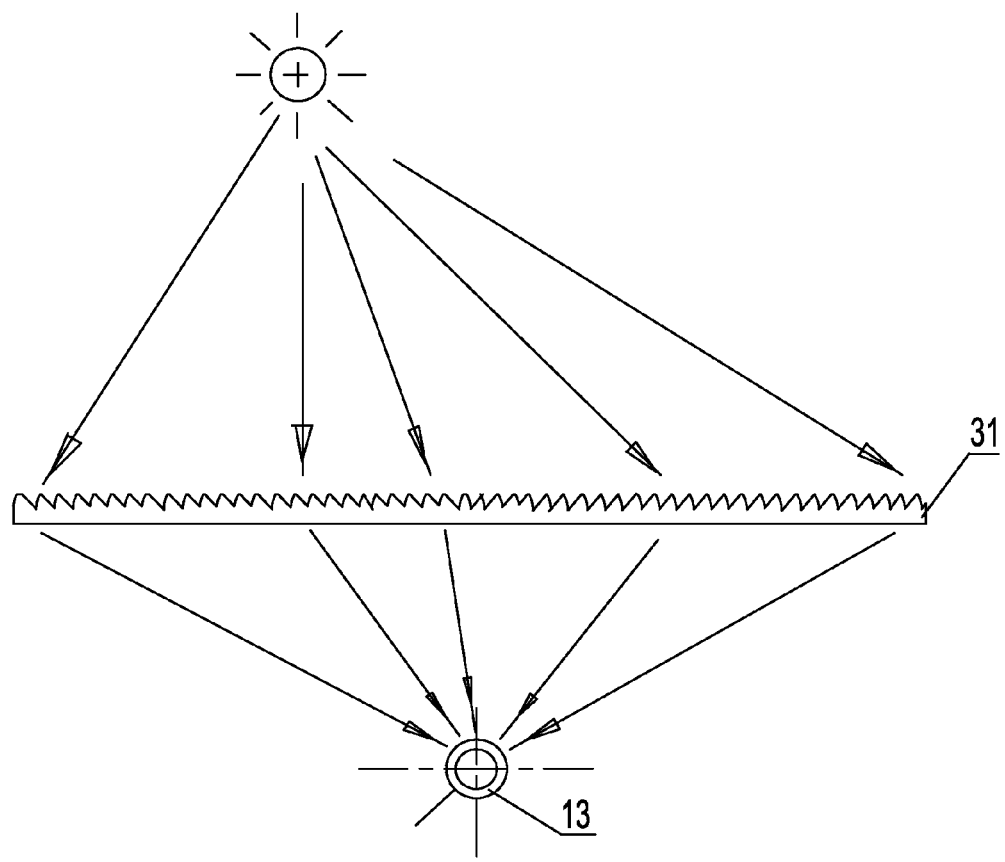
FIG. 4 is a structure diagram of a solar concentrating collector comprising a transmission Fresnel lens and a vacuum solar collector tube.

FIG. 4 is a structure diagram of a solar concentrating collector comprises: a transmission Fresnel lens, and a vacuum solar collector tube. The solar concentrating collector comprises: a transmission Fresnel lens 31, and the vacuum solar collector tube 13. The vacuum solar collector tube 13 is disposed on a focal line of the transmission Fresnel lens 31.

The biomass fuel storage field of the biomass boiler comprising a roof having a suitable height and large enough area. The solar concentrating collector is disposed on the roof of the biomass fuel storage field (or be a roof unit). Water works as a heat transfer medium of the solar concentrating collector and the biomass boiler, and is alternatively or simultaneously input into the solar collector tube or the biomass boiled after being pretreated by the same chemical water treatment device (a desalting water tank of any known chemical water treatment device is required to provide with a heat insulation layer). The water is then transformed into steam, which is input into the turbine to drive the electric generator.

The biomass boiler and the solar concentrating collector is provided with switch valves 18, 19, 20, 22 (by adopting a pneumatic valve, an electric valve, a hydraulic valve, or an electromagnetic valve). The operating state of the water and the steam in the biomass boiler and the solar concentrating collector can be easily changed by opening or closing some of these switch valves, so that the whole power generation system is in a solar power generation mode, a biomass power generation mode, or a solar-biomass combined power generation mode.

Obviously, the biomass boiler 6 in FIG. 1 can be substituted by a biomass synthesis gas-fired boiler, a coal-fired boiler, an oil-fired boiler, a natural gas-fired boiler, a coal field methane boiler, or an oil field boiler in prior arts Obviously, the vacuum solar collector tube in FIGS. 1-4 can be substituted by a blackbody solar collector tube in prior arts.

A working process of the solar power generation system is described as follows combined with FIGS. 1 and 2.

The solar concentrating collector and the biomass boiler employ water as the working medium for heat adsorption and heat storage. The biomass boiler works as a second heat source for providing the auxiliary heat source to the solar power generation. The biomass boiler and the solar concentrating collector are simultaneously started.

The process specifically comprises the following steps:

1) igniting the biomass boiler when a water level of the boiler drum reaches a preset water level; and starting the turbonator unit according to an operating procedure of a biomass boiler power plant;

2) starting the solar concentrating collector (at the moment the first control valve is in a close state); measuring a water temperature t3 at a water outlet main of the solar concentrating collector; opening the second control valve arranged between the water outlet main of the solar concentrating collector and the boiler drum when $t3 \geq 95°$ C., and opening the third control valve to supply water to the solar collector tube; introducing water into the boiler drum; adjusting the water supply to the solar collector tube to maintain $t3 \geq 95°$ C. according to the water temperature t3; and self-regulating by a control system of the turbonator unit, maintaining the water level of the boiler drum, a vapor pressure and a vapor temperature at a vapor outlet of the biomass boiler at rated values, and maintaining a steady operation of the turbonator unit;

3) closing the second control valve of the water outlet main and the third control valve to prevent water in the solar collector tube from running and to maintain the water in a heat preserving and inactive state if the water supply to the solar collector tube is adjusted to a lowest value (generally to a value that is 10% of a rated water flow into the biomass boiler, but no excluding a water flow lower than 10% of the rated value) while the water temperature t3 at the water outlet main of the solar concentrating collector detected by the turbonator unit decreases and $t3<95°$ C.; turning the turbonator unit into a thermal power generation mode; self-regulating by the control system of the turbonator unit; increasing a fuel input into the biomass boiler to maintain the vapor pressure and the vapor temperature at the vapor outlet of the biomass boiler at rated values and to maintain the steady operation of the turbonator unit;

4) opening the first control valve arranged between the water outlet main of the solar concentrating collector and the water supply tank if the water temperature t3 at the water outlet main of the solar concentrating collector continues decreasing and when $t3=5-9°$ C.; opening a bleed valve to drain a room temperature water from the solar collector tube into a desalting water tank; opening a drain valve to remove remaining water from pipes; introducing compressed air via an opening of an exhaust valve into all pipes until no water remains; maintaining the solar concentrating collector and pipes at an anhydrous antifreezing state; and turning the turbonator unit into a biomass boiler power generation mode; and 5) repeating step 1) if the water temperature in the solar collector tube increases and $t3 \geq 95°$ C. due to a recovery of a solar radiation; supplying water to the biomass boiler; and decreasing the fuel input into the biomass boiler by self-regulating of the turbonator unit.

Starting a new solar power generation system (or restart the whole system after a major repair) of the invention: Before the sunrise, close the switch valve 21, open switch valves 18, 19, 20, 22, and start the second water pump 11 to ensure the water level of the boiler drum 6a detected by the water level gauge L1 reach the preset water level and the water is filled with all the solar collector tubes. At the sunrise, ignite the biomass boiler, and start the turbonator unit according to an operating procedure of a biomass boiler power plant. Along with the rise of the sun, the solar radiation sharply increases to a highest point during half an hour at a local time of 8:00, the heated water from the solar concentrating collector is directly injected into the boiler drum 6a. Take a 65 T/h middle temperature and pressure biomass boiler as an example, a rated pressure p1=5.29 mPa, a rated temperature t1=450° C., and a water temperature of at the outlet of the auxiliary heater 7 is 231° C. Maintain the water level of the boiler drum 6a, p1, and t1 at rated values to maintain a steady operation of the turbonator unit.

Scheme A is adopted that the solar concentrating collector and the biomass boiler as an auxiliary heat source operate simultaneously in conditions of cloudy and rainy day during the diurnal period. Specific process of the scheme A is as follows:

In cloudy and rainy day during the diurnal period, the water temperature t3 at the water outlet main of the solar concentrating collector drops, thus, the control system of the turbonator unit self-regulates to increase the fuel input into the biomass boiler until the water level of the boiler drum 6a, p1, and t1 are maintained at the rated values. When the cloud layer becomes more thicker and rains, the water temperature t3 at the water outlet main of the solar concentrating collector continues decreasing, and when t3 decreases to 231° C. below about 95° C. (according to a lowest temperature value for the safe operation of the biomass boiler), the second control valve 22 of the water outlet main of the solar concentrating collector and the third control valve 19 are closed to prevent water in the solar collector tube from running and to maintain the water in a heat preserving and inactive state. Thus, the turbonator unit is turned into a thermal power generation mode. When the cloud layer disperses and the solar radiation recovers, the water temperature t3 at the water outlet main of the solar concentrating collector increases and when t3 is 95° C. above, the second control valve 22 and the third control valve 19 are opened to resume the operation of the solar collector field, water is input into the boiler drum 6a. Along with the increasing of the water temperature in the solar collector tubes, the fuel input into the biomass boiler is decreased under the self-regulating of the turbonator unit.

Scheme B is adopted during nocturnal period of darkness, and specific process of the scheme B is as follows:

Before the darkness of the night when the solar concentrating collector captures no sunlight, the water temperature at the water outlet main of the solar concentrating collector falls, if t3 is lower than a range between 9° C. and 5° C. (t3≥5° C.), the system carries out scheme A. Water in the solar collector tube is prevented from running and in a heat preserving and inactive state. The turbonator unit is turned into a thermal power generation mode until the daytime when no cloud layer exists and the sun radiation recovers.

Scheme C is adopted during nocturnal period when the temperature falls to a water freeze point (or in cloudy days when the temperature falls to the water freeze point), and specific process of the scheme C is as follows:

Before the darkness of the night when the solar concentrating collector captures no sunlight, the system conducts scheme B. If t3 continues decreasing and when t3=5-9° C., the first control valve 21 and the bleed valve 27 are opened to drain a room temperature water from the solar collector tube into the desalting water tank 12. The drain valve 29 is opened to remove remaining water from pipes. The compressed air is introduced through air vents into all pipes until no water remains. Thus, the solar concentrating collector and pipes are maintained at the anhydrous antifreezing state; and the turbonator unit is turned into the biomass boiler power generation mode.

In summary, the power generation system of the invention is the solar power generation system using the biomass boiler as the auxiliary heat source, water is direct heated by the system. The invention is simplified by discarding a heat storage system (using a conduction oil or a molten salt as a heat storage medium) applied in a solar thermal power plant of prior arts, and is capable of alternatively or simultaneously making use of the solar heat source or the biomass heat source according to the change of the solar radiation due to the alternation of day and night and the change of the weather to maintain the continuous operation of the turbonator unit day and night, thereby effectively improving the availability of the solar energy power generation system, as well as solving the problem of the freeze prevention of the solar concentrating collector during winter is solved.

While particular embodiments of the invention have been shown and described, it will be obvious to those skilled in the art that changes and modifications may be made without departing from the invention in its broader aspects, and therefore, the aim 1n the appended claims is to cover all such changes and modifications as fall within the true spirit and scope of the invention.

The invention claimed is:

1. A method of power generation, comprising the following steps:
  1) igniting a biomass boiler comprising a boiler drum when a water level of the boiler drum reaches a preset water level; and starting a turbonator unit according to an operating procedure of a biomass boiler power plant;
  2) starting a solar concentrating collector; measuring a water temperature t3 at a water outlet main of the solar concentrating collector; opening a second control valve arranged between the water outlet main and the boiler drum when t3 ≥95° C., and opening a third control valve to supply water to a solar collector tube; introducing the water into the boiler drum; adjusting the water supply to the solar collector tube to maintain t3≥95° C.; and maintaining the water level of the boiler drum, a vapor pressure, and a vapor temperature at a vapor outlet of the biomass boiler at rated values and maintaining a steady operation of the turbonator unit by self-regulating of a control system of the turbonator unit;
  3) closing the second control valve of the water outlet main and the third control valve to prevent water in the solar collector tube from running and to maintain the water in a heat preserving and inactive state if the water supply to the solar collector tube is adjusted to a lowest value while the water temperature t3 at the water outlet main of the solar concentrating collector detected by the turbonator unit decreases and t3<95° C.; turning the turbonator unit into a thermal power generation mode; increasing a fuel input into the biomass boiler by self-regulating of the control system of the turbonator unit to maintain the vapor pressure and the vapor temperature at the vapor outlet of the biomass boiler at rated values and to maintain the steady operation of the turbonator unit;
  4) opening a first control valve arranged between the water outlet main of the solar concentrating collector and a water supply tank if the water temperature t3 at the water outlet main of the solar concentrating collector continues decreasing and when t3=5-9° C.; opening a bleed valve to drain room temperature water from the solar collector tube into a desalting water tank; opening a drain valve to remove remaining water from pipes; introducing compressed air via an opening of an exhaust valve into all pipes until no water remains; maintaining the solar concentrating collector and pipes at an anhydrous and antifreezing state; and turning the turbonator unit into a biomass boiler power generation mode; and
  5) repeating step 1) if the water temperature in the solar collector tube increases and t3≥95° C. due to a recovery of a solar radiation; supplying water to the biomass boiler; and decreasing the fuel input into the biomass boiler by self-regulating of the turbonator unit.

2. A solar power generation, system, comprising:
  a solar concentrating collector;
  a biomass boiler; and
  a turbonator unit;
wherein:
  the solar concentrating collector and the biomass boiler employ water as a working medium for heat adsorption and heat storage;
  the solar concentrating collector adopts medium pressure vacuum solar collector tubes in a combination of a series-parallel matrix;
  a water supply tank of the solar concentrating collector and the biomass boiler is a desalting water tank comprising a heat insulation layer;
  the desalting water tank is connected to a deaerator via a first water pump, and further connected to the solar collector tube and a water inlet of the biomass boiler via the deaerator and a second water pump;
  the desalting water tank is connected to the outlet of the solar concentrating collector via a first control valve;
  an outlet of the solar concentrating collector is connected to a bottom of a boiler drum via a second control valve; and
  a vapor outlet of the boiler drum is connected to a cylinder of a turbine.

3. The solar power generation system of claim 2, wherein a steam superheater is in series connection between the vapor outlet of the boiler drum and a pipe connected to the cylinder of the turbine;

the steam superheater communicates with an inlet of a high pressure cylinder of the turbine; and the steam superheater is placed inside a flue of the biomass boiler.

4. The solar power generation system of claim 2, wherein an outlet of a high pressure cylinder is connected to a steam reheater via a pipe;

the steam reheater is connected to an inlet of a low pressure cylinder of the turbine; and the steam reheater is placed inside a flue of the biomass boiler.

5. The solar power generation system of claim 2, wherein a condenser communicates with an outlet of the cylinder of the turbine;

a water outlet of the condenser communicates with a deaerator; and the water outlet of the condenser communicates with the solar collector tube and/or a water inlet of the biomass boiler via the deaerator and the second water pump.

6. The solar power generation system of claim 2, wherein an auxiliary heater is in series connection with a water inlet pipe of the biomass boiler, and the auxiliary heater is placed inside a flue of the biomass boiler.

7. The solar power generation system of claim 2, wherein the solar concentrating collector comprises: a parabolic chute mirror, and the vacuum solar collector tube; and the vacuum solar collector tube is disposed on a focal line of the parabolic chute mirror.

8. The solar power generation system of claim 2, wherein the solar concentrating collector comprises: a reflective Fresnel lens, and the vacuum solar collector tube; and the vacuum solar collector tube is disposed on a focal line of the reflective Fresnel lens.

9. The solar power generation system of claim 2, wherein the solar concentrating collector comprises: a transmission Fresnel lens, and the vacuum solar collector tube; and the vacuum solar collector tube is disposed on a focal line of the transmission Fresnel lens.

10. A solar power generation system, comprising:
a solar concentrating collector;
a biomass boiler; and
a turbonator unit;
wherein:
the solar concentrating collector and the biomass boiler employ water as a working medium for heat adsorption and heat storage;
the solar concentrating collector adopts medium pressure vacuum solar collector tubes in a combination of a series-parallel matrix;
a temperature sensor is arranged on a pipe between a water outlet of the solar concentrating collector, and a first control valve and a second control valve;
an outlet of the solar concentrating collector is connected to a bottom of a boiler drum via the second control valve;
a vapor outlet of the boiler drum is connected to a cylinder of a turbine;
a control point displayed by the temperature sensor is output in a control loop of the second control valve and the first control valve; and
an operating temperature of the temperature sensor is preset within a temperature range of a safe operation of the biomass boiler.

\* \* \* \* \*